US006731908B2

(12) United States Patent
Berliner et al.

(10) Patent No.: US 6,731,908 B2
(45) Date of Patent: May 4, 2004

(54) DISTANCE MEASUREMENT USING HALF-DUPLEX RF TECHNIQUES

(75) Inventors: Shlomo Berliner, Rehovot (IL); Uri Holzkaner, Rehovot (IL); Edward Mirodin, Rehovot (IL)

(73) Assignee: Bluesoft, Inc., San Mateo, CA (US)

( * ) Notice: Subject to any disclaimer, the term of this patent is extended or adjusted under 35 U.S.C. 154(b) by 424 days.

(21) Appl. No.: 09/759,602

(22) Filed: Jan. 16, 2001

(65) Prior Publication Data

US 2002/0094786 A1 Jul. 18, 2002

(51) Int. Cl.⁷ ............................................... H04B 17/00
(52) U.S. Cl. ................................ 455/67.11; 455/67.16; 455/550.1; 455/456.1; 342/47; 342/127
(58) Field of Search ........................... 455/67.11, 67.14, 455/67.16, 76, 115.1, 502, 507, 550.1, 404.2, 456.1, 456.6; 342/47, 127

(56) References Cited

U.S. PATENT DOCUMENTS

| 3,619,058 A | 11/1971 | Hewlett ........................ 356/5 |
| 3,681,695 A | 8/1972 | Cease et al. ................. 325/305 |

(List continued on next page.)

(List continued on next page.)

FOREIGN PATENT DOCUMENTS

| EP | 0 926 510 A1 | 6/1999 |
| WO | WO 256673 | 8/1996 |

OTHER PUBLICATIONS

The Official Bluetooth Website, 1 page. Internet source. Apr. 10, 2000.
Designing Cableless Devices with the Bluetooth Specification, 8 pages. Internet source. Apr. 10, 2000.
R.J. Palmer, "Test Results of a Precise, Short Range, RF Navigational/Positional System," IEEE Vehicle Navigation and Information Systems Conference (VNIS '89) (1st: 1989: Toronto), compiled and edited by D.H.M. Reekie, E.R. Case and J. Tsai, pp. 151–155.

*Primary Examiner*—Edward F. Urban
*Assistant Examiner*—Simon Nguyen
(74) *Attorney, Agent, or Firm*—Andrew M. Harris; Harry M. Weiss; Weiss, Moy & Harris, P.C.

(57) ABSTRACT

A system, apparatus, and method for determining the distance between two objects using an indirect propagation delay measurement is disclosed. A frequency hopping scheme (such as the Bluetooth™ technology) is used to measure the relative phase offset of the received signal between the various frequencies. For a given distance between the objects, the phase offset vs. frequency curve is a straight line with the slope dependent upon the measured distance. After the phase of the received signals is detected, the data is plotted on a curve and the slope is calculated.

A wireless slave device remains phase locked with another device in a half-duplex communication mode by employing a low-drift phase locked loop employing a voltage controlled crystal oscillator. The phase locked loop further employs a mechanism that provides immunity from transitory phase slip at a time when the loop is opened.

25 Claims, 11 Drawing Sheets

U.S. PATENT DOCUMENTS

| | | | |
|---|---|---|---|
| 3,778,159 A | 12/1973 | Hines et al. | 356/5 |
| 3,779,645 A | 12/1973 | Nakazawa et al. | 356/5 |
| 4,017,859 A | 4/1977 | Medwin | 343/100 CL |
| 4,328,499 A | 5/1982 | Anderson et al. | 343/113 R |
| 4,433,335 A | 2/1984 | Wind | 343/463 |
| 4,633,411 A | 12/1986 | Bliss et al. | 364/481 |
| 4,804,961 A * | 2/1989 | Hane | 342/125 |
| 4,851,851 A | 7/1989 | Hane | 342/112 |
| 5,082,364 A | 1/1992 | Russell | 356/5 |
| 5,099,248 A | 3/1992 | Brommer | 342/430 |
| 5,136,298 A | 8/1992 | Williams | 342/112 |
| 5,170,172 A | 12/1992 | Weinstein | 342/458 |
| 5,173,709 A | 12/1992 | Lauro et al. | 342/443 |
| 5,400,130 A * | 3/1995 | Tsujimoto et al. | 356/5.01 |
| 5,428,439 A | 6/1995 | Parker et al. | 356/5.01 |
| 5,448,248 A | 9/1995 | Anttila | 342/400 |
| 5,481,503 A | 1/1996 | Kuhn et al. | 367/100 |
| 5,550,549 A * | 8/1996 | Procter et al. | 342/47 |
| 5,596,330 A * | 1/1997 | Yokev et al. | 342/387 |
| 5,687,196 A | 11/1997 | Proctor, Jr. et al. | 375/347 |
| 5,694,133 A | 12/1997 | Ghose | 342/372 |
| 5,724,047 A | 3/1998 | Lioio et al. | 342/442 |
| 5,745,224 A | 4/1998 | Oda et al. | 356/4.01 |
| 5,767,409 A | 6/1998 | Yamaguchi | 73/602 |
| 5,781,282 A | 7/1998 | Oda et al. | 356/5.03 |
| 5,784,339 A | 7/1998 | Woodsum et al. | 367/134 |
| 5,815,117 A | 9/1998 | Kolanek | 342/442 |
| 5,828,693 A | 10/1998 | Mays et al. | 375/202 |
| 6,067,039 A * | 5/2000 | Pyner et al. | 342/125 |
| 6,181,944 B1 * | 1/2001 | Uebayashi et al. | 455/456.2 |
| 6,297,773 B1 * | 10/2001 | Fullerton et al. | 342/457 |

* cited by examiner

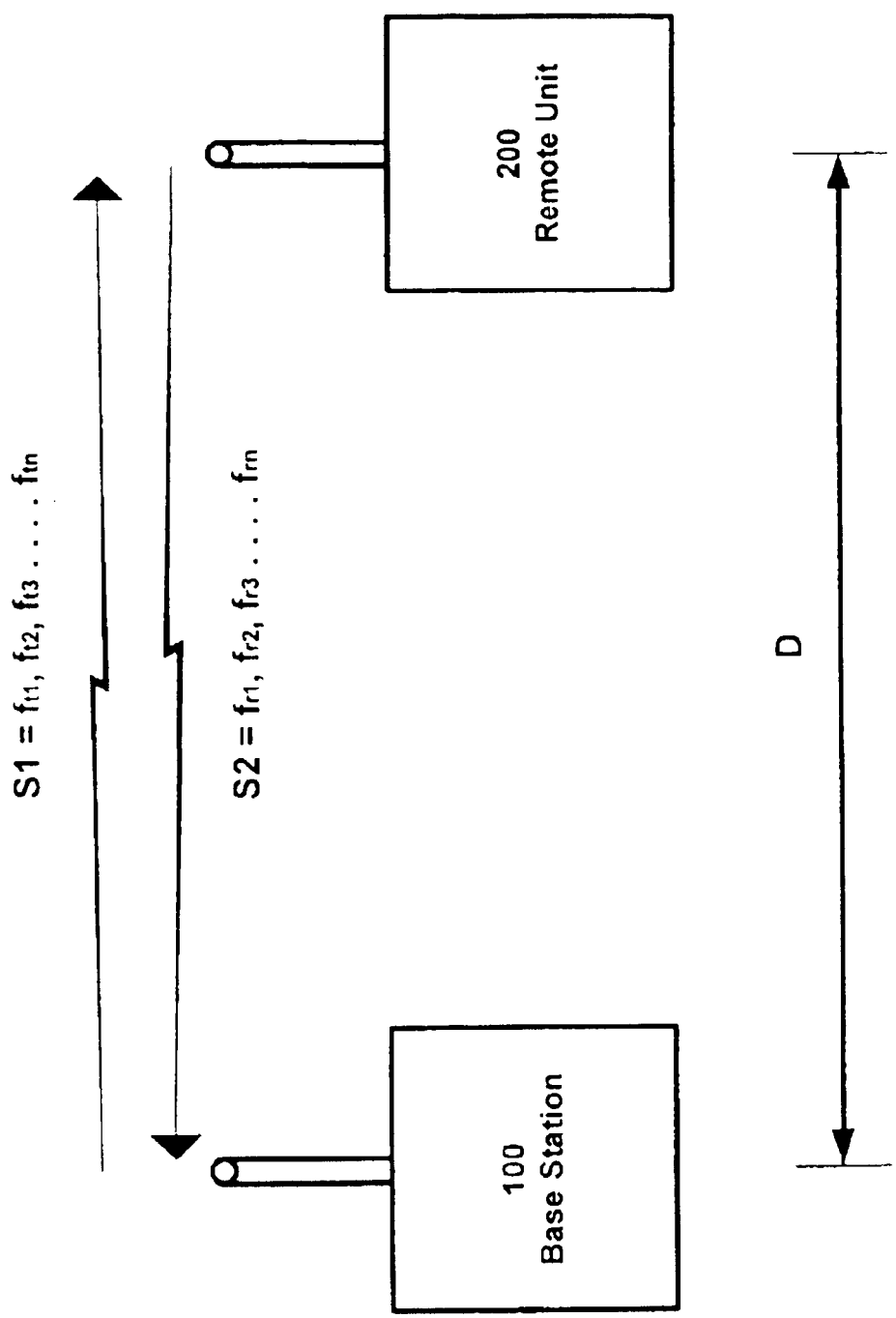

DISTANCE MEASUREMENT USING HALF-DUPLEX RF TECHNIQUES

BACKGROUND OF THE INVENTION

1. Field of Invention

The present invention relates to a half-duplex method and apparatus for measuring a distance between two objects using RF techniques. More specifically, the present invention relates to a method and apparatus for maintaining phase lock between two wireless devices in a half-duplex distance measurement system.

2. Description of the Related Art

Mobile telephones, pagers, and other wireless communication equipment are now commonplace. More recently, laptop computers, personal digital assistants (PDAs)—such as the Palm™ organizer—have been equipped with wireless communications capabilities. One of the primary benefits of wireless equipment is portability. We can carry our mobile phone with us wherever we go. These wireless devices are currently used for relatively limited purposes, such as making telephone calls, when they are capable of doing much more.

One potential use for wireless devices is in mobile commerce. Wireless devices can be used for buying or selling goods or services, making payments, gathering information, advertising and promotion, and the exchange of information for other commercial or non-commercial purposes. The success of mobile commerce and other wireless applications will depend on their acceptance by consumers at large. Accordingly, wireless applications must be easy to use and convenient. New platforms are being developed to enable mobile commerce and other applications for wireless devices. Bluetooth™ is such a technology. Bluetooth™ provides a wireless networking protocol for linking various wireless equipment, such as mobile computers, mobile phones, and PDAs. Bluetooth™ operates in the Industrial Scientific and Medical (ISM) 2.4 GHz region.

In addition to platforms such as Bluetooth™, wireless devices require additional enabling technologies to reach their full potential. One such technology involves distance measurement. The distance between two or more wireless devices may be needed in a variety of applications. In many cases, it may be undesirable to measure the distance between two wireless devices directly. Direct distance measurement may be impossible, impractical, intrusive, or simply inconvenient. Moreover, because one or more wireless devices may be moved, the distance between devices will not be fixed indefinitely and re-calculation may be needed.

In such situations, 'wireless' distance measurements are used. Some 'wireless' distance measurement systems require an infrastructure to be put in place such as GPS based systems, triangulation methods, and other positioning techniques. Other systems require line-of-sight conditions (e.g., infra red, laser, and optical methods). Radar as well as ultra sonic systems are bulky, complex, and consume significant amounts of power. New ultra wide band techniques are currently not approved by the authorities. Some less expensive systems offer solutions based on field strength measurements with the tradeoffs of reduced reliability and high environmental dependency.

SUMMARY OF THE INVENTION

The present invention has been made in view of the above circumstances and has an object to provide a system and method for accurately measuring distance using RF techniques. In one aspect of the invention there is provided a half-duplex wireless remote device for use in a distance measurement system, comprising a receiver for receiving a first radio frequency (RF) signal during a first time slot An from a wireless communication device, the first RF signal including a sequence of carriers fn, where n is a plurality of integers, wherein the sequence of carriers fn are phase coherent with a first reference signal generated at the wireless communication device, the receiver generating a second reference signal from the received first RF signal during the time slot An, wherein the second reference signal is phase coherent with the received first RF signal; a phase locked loop (PLL) for generating a third reference signal synchronized in frequency and phase with the second reference signal; a synthesizer for generating a second RF signal, the second RF signal being phase coherent with the third reference signal and including a sequence of carriers corresponding to the carriers fn of the first RF signal; and a transmitter for transmitting the second RF signal during a second time slot Bn, wherein the first time slot An and the second time slot Bn alternatingly repeat as n changes.

In another aspect of the invention, there is provided a method of phase locking a wireless communication device and a wireless remote device, comprising the steps of receiving a first radio frequency (RF) signal during a first time slot An from the wireless communication device, the first RF signal including a sequence of carriers fn, where n is a plurality of integers, wherein the sequence of carriers fn are phase coherent with a first reference signal generated at the wireless communication device, generating a second reference signal during the time slot An from the second reference signal, the second reference signal being phase coherent with the received first RF signal; generating a third reference signal synchronized in frequency and phase with the second reference signal; generating a second RF signal, the second RF signal being phase coherent with the third reference signal and including a sequence of carriers corresponding to the carriers fn of the first RF signal; and transmitting the second RF signal during a second time slot Bn, wherein the first time slot An and the second time slot Bn alternatingly repeat as n changes.

Additional objects and advantages of the invention will be set forth in part in the description that follows, and in part will be obvious from the description, or may be learned by practice of the invention. The objects and advantages of the invention will be realized by means of the elements and combinations particularly pointed out in the appended claims.

It should be understood that both the foregoing general description and the following detailed description are exemplary and explanatory only and are not restrictive of the invention as claimed. It will be apparent to those skilled in the art that various modifications and variation can be made without departing from the scope or spirit of the invention.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIG. 2 is an illustrative block diagram of a base station and remote unit in accordance with an embodiment of the present invention.

DETAILED DESCRIPTION

Figure 1:
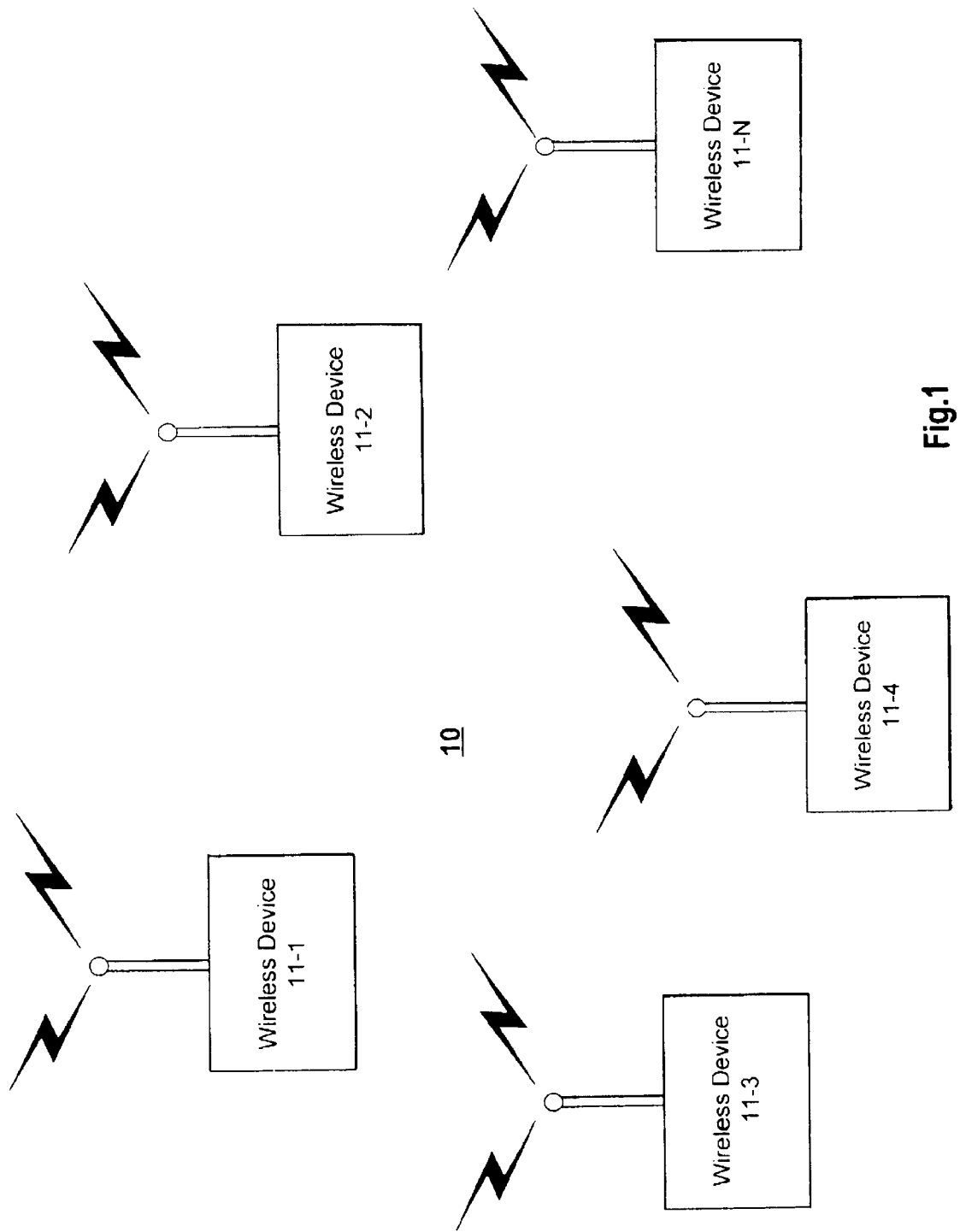
FIG. 1 is a block diagram illustrating an example of multiple wireless devices in accordance with the present invention.

FIG. 1 provides a block diagram illustrating an embodiment of a system 10 in which the present invention may be used. As shown in FIG. 1, the system 10 includes a plurality of wireless devices 11-1 to 11-N (collectively referred to as wireless devices 11) within a particular region. The wireless devices 11 may be communications devices capable of transmitting and receiving information between devices. The information communicated may be data or voice information. At least one and possibly all of the wireless devices 11 are mobile communications devices. For example, the wireless devices 11 may be mobile phones or pagers, or PDAs, handheld computers, laptop computers, or other devices equipped with wireless communications capabilities, or a combination of any of the foregoing. Moreover, the set of wireless devices 11 in the region is not necessarily fixed. Additional wireless devices 11 may enter the region and existing wireless devices 11 may leave the region. It should be understood, however, that the present invention may be used with stationary wireless devices.

To facilitate communications, each wireless device 11 includes one or more antennas. In a preferred embodiment, the antennas are omnidirectional antennas so that a particular wireless device 11 can communicate with any of the other wireless devices 11 within its operable range without regard to where the other wireless devices 11 are located. Of course, other antenna designs may be used with any one or more of the wireless devices 11.

Each of the wireless communications devices 11 may store unique identifying data that it can transmit to the other wireless communication devices 11 in the region. Accordingly, each wireless communication device 11 can identify itself to the other communication devices 11 and distinguish between other wireless communication devices using the identifying data. For example, a wireless device 11-1 can transmit RF signals containing communication data intended specifically for wireless device 11-3. By including the identifying data in the RF transmission, wireless device 11-3 can receive and perform actions responsive to the communication data, while other wireless devices 11 ignore the data. The communication data may be, for example, commercial data exchanged in a commercial transaction between owners or users of wireless devices 11-1 and 11-3. Alternatively, or in addition, the communication data may include advertising data, news, weather, or other useful information.

Communications between the wireless devices 11 can be carried out using a protocol employing a master-slave relationship. In this case, one of the wireless devices 11 in a particular region may be a master with one or more others of the wireless devices 11 in the region serving as a slave. The master device will control communications carried out with the slave devices. In one embodiment, the wireless devices 11 communicate using the Bluetooth™ protocol, but of course other protocols may be used. The Bluetooth™ protocol uses a half-duplex, frequency-hopping hopping scheme operating in the 2.4 GHz band. Bluetooth™ devices hop through 1600 frequency channels per second, with 800 transmit and 800 receive channels. The channels span 79 MHz with a 1 MHz spacing between adjacent channels. Bluetooth™ allows various wireless equipment (mobile phones, mobile computers, etc.) to communicate over relatively short range of about 100 meters.

The present invention determines the distance between wireless devices using an indirect propagation delay measurement. For example, an RF signal, transmitted from wireless device A to wireless device B, will be received at a given phase angle. Fundamentally, for a given transmission distance, there is a linear relationship between the received phase angle offset of the RF signal and the frequency of the RF signal. Accordingly, for a given distance between the devices, the received phase offset angle vs. frequency curve is theoretically a straight line with the slope of the line dependent upon the measured distance. Specifically, the distance between objects is proportional to the slope of the phase/frequency curve. Therefore, by transmitting an RF signal at multiple frequencies, and observing the received phase offset-angles of the RF signal for each of those frequencies, the distance between wireless devices can be calculated. Further, this differential phase measurement resolves the ambiguity caused by the unknown number of cycles the signal has completed before the received signal arrives at the receiving antenna.

One difficulty in implementation is caused by "phase folding." As the frequency of the received RF signal increases, the received phase also increases. Since the phase measurement is constrained to a value from $-\pi$ to $\pi$, the phase angle will "fold" over to $-\pi$ each time it exceeds $\pi$. A unique algorithm (e.g., software implemented) detects phase "folding" every time the phase difference completes a whole cycle, and corrects by adding $\pi$; to the phase result each time a negative slope ($\pi => -\pi$) is detected. In this way, a linear series of received phase angles can be obtained. After the phase angles of the received RF signals are detected and corrected for the phase folding effect, the slope of the phase angle data, relative to frequency, can be calculated.

One or more techniques to measure distance between wireless devices using the above described method can be implemented, for example, as suggested in related patent application U.S. Application No. 09/759,601, filed concurrently herewith and expressly incorporated by reference herein. Further, it should be noted that a significant distortion of the measured phase angles may occur in practice as a result of the multipath phenomenon. One or more techniques to analyze, minimize, or eliminate multipath interference can be implemented, for example, as suggested in related patent application U.S. Application No. 09/759,600, filed concurrently herewith and expressly incorporated by reference herein.

As can be appreciated from the above-described method, the accuracy of phase measurement depends on maintaining a stable drift-free phase lock between the base station and the remote station. In full-duplex systems, the return path signal (e.g., from the slave device) can be continuously phase locked to the forward path signal (from the master device). However, in half-duplex systems, the master device signal stops transmitting during the time when the slave device is transmitting. Thus, no received forward path signal exists at the slave device during the time when the return path signal is being generated by the slave device.

The remote station should preserve the phase information of the received forward path signal, even after the signal is no longer being received, for at least the period the remote station is transmitting. One method of accomplishing this is to lock the slave device receiver's VCO on the incoming signal while the incoming signal is being transmitted. The control voltage on the VCO may be retained by using a large capacitor for example. Near the end of the forward path signal cycle, the control voltage is disconnected from the source (typically an integrator and/or phase comparator) and the control voltage is maintained at a constant level by the capacitor. After the forward path signal resumes, the control voltage is reconnected to the control voltage source.

Another way to maintain phase and frequency lock between the base station and remote station is to us analog-to-digital (ADC) and digital-to-analog (DAC) converters. For example, the voltage from the control source is converted to a digital value by an ADC. The digital value is then converted back to an analog value using a DAC. This reconstructed analog value is coupled to the input of the VCO. Just before the forward path signal stops, the clocks to the converters are halted, thereby maintaining the current analog value in a static state at the input of the VCO.

When designing a phase locked loop system for use in a half-duplex system, two main factors are important in maintaining an accurate phase lock. First, continuous frequency drift after the synchronization loop is opened should be minimized. The longer the loop remains open, the lower the permitted drift rate. Second, the effect of frequency/phase momentary slip caused by slight changes in the tuning voltage as a result of opening the loop should also be minimized or eliminated. This type of transitory phenomenon is particularly troublesome in open loop operation because once the phase has shifted significantly, accurate phase lock cannot be recovered until the master device begins transmitting again.

As described above, the technique of the present invention requires transmission and reception at multiple frequencies to determine the distance between wireless devices. Consequently, a frequency hopping scheme (such as that employed by Bluetooth™ technology) serves as an appropriate platform on which to implement the invention. While the invention will be described with respect to Bluetooth™, this is just one of many possible implementations of the invention. Any number of methods that employ transmission of multiple frequencies could be used to implement the invention.

The present invention may be used in a variety of applications including, but not limited to, mobile commerce, mobile banking, and information on demand. While the present invention can be used to measure the distance between two wireless devices without any additional infrastructure, e.g., a base station and a remote unit, it can also be used to determine distance between any number of wireless devices, e.g., a base station and multiple remote wireless devices, or between remote wireless devices.

Transactions between wireless devices may be directed based on the result of this distance measurement. For example, if the distance between the wireless devices is within a specified criteria, information (advertisements, news, weather, travel) may be pushed from one unit to the other, payment for goods, services or information may be effected, or banking transactions initiated (e.g., obtaining account statement information, transferring funds between accounts). Other applications will be known to those skilled in the art and are within the scope of the present invention.

FIG. 2 illustrates the operation of an embodiment of the present invention. For simplicity, the operation of the present invention will be described with reference to two wireless devices: a base station 100 and a remote unit 200. Base station 100 and remote station 200 may be two of the wireless devices of FIG. 1. As shown, the base station unit 100 is separated from the remote unit 200 by a distance D. As described above, the distance may be determined by measuring the differential phase between two or more frequencies of a signal transmitted between the base station 100 and the remote unit 200. In one embodiment of the present invention, frequency hopping is used by the base station 100 and the remote unit 200 to generate the signals necessary to determine the distance measurement.

A signal S1 using a sequence of carriers at frequencies $f_{r1}$, $f_{r2}$, ... $f_{rn}$ is generated at base station 100 and transmitted to remote unit 200. At remote unit 200, the signal S1 is received and demodulated. The demodulated signal is used as a reference to generate a second signal S2. Signal S2 includes a sequence of carriers having frequencies $f_{r1}$, $f_{r2}$, ... $f_{rn}$. The remote unit transfers the phase information of signal S1 to signal S2. The frequencies in each sequence of carriers may be in ascending order, in descending order, another pattern, or in random order, for example. Additionally, the spacing between adjacent carrier frequencies contained in a sequence (i.e., irrespective of their order in the sequence) may be constant, vary according to a pattern, skip some frequencies, or occur randomly within a range. Thus, base station 100 and remote unit 200 remain synchronized, or phase locked, with each other. Signal S2 is transmitted from the remote unit 200 back to the base station 100 where it is frequency converted to the frequencies of signal S1 and phase compared with the signal S1. Alternatively, an additional RF signal, phase coherent with S1, may be generated in base station 100 and be used to do the phase comparison with S2. This arrangement obviates the need to frequency convert S2 before performing the phase comparison.

Phase comparison of the corresponding frequency increments of signal S1 and frequency converted signal S2 provides a phase offset $\Theta i$ for each of the frequencies. The relative phase offsets $\phi i$ between the frequency increments is calculated by subtracting phase offsets $\Theta i$ of the carriers of S2 having adjacent frequencies. A software implemented phase ambiguity algorithm is applied during the calculation to account for the phase folding resulting from any repeated cycling of the phase difference from $-\pi$ to $+\pi$. Once the relative phase offset information is obtained, the distance D can be calculated from the slope of the relative phase offsets (φi) v. frequency data.

The embodiment illustrated in FIG. 2 is directed to a half-duplex system in which signal transmission and reception are time-multiplexed thereby allowing the frequency(s) of S1 to be the same as the frequencies of S2. Of course, the present half-duplex embodiment could also be implemented, for example, using different frequencies for signals S1 and S2.

RF communications, control, and processing functionality of the base station 100 may be performed by common equipment, for example, under different software control, or may be performed by different equipment. Examples are described below in connection with FIGS. 3A, 3B, and 3C. However, it should be understood that control, processing, and RF communications functionality may be performed by various equipment configurations depending on the type of device that base station 100 embodies and the degree of overlap and compatibility between the distance measurement functionality and other functionality of the base station 100.

For example, if the base station 100 is a Bluetooth-enabled mobile telephone, the base station 100 requires RF communications for mobile telecommunications, distance measurement, and Bluetooth communications. The same or different control and/or RF equipment may be used for wireless communications to network infrastructure (e.g., mobile telephone to cellular base station), for distance measurement, and for direct wireless device-to-wireless device (e.g., Bluetooth) communications. The same may be true of a Bluetooth-enabled laptop with a RF modem for linking to an ISP and many other devices equipped for wireless communications using multiple different protocols. On the other hand, the base station 100 may embody a wireless device that supports distance measurement and a single wireless communications protocol (e.g., a Bluetooth-equipped vending machine, a mobile telephone, laptop with an RF modem, etc.). The same or different control and/or RF equipment may be used for wireless communications and for distance measurement. Finally, the base station 100 may be equipped for RF communication only to perform wireless distance measurement. In this case, only a single RF communications equipment for distance measurement need be provided.

Figure 3A:
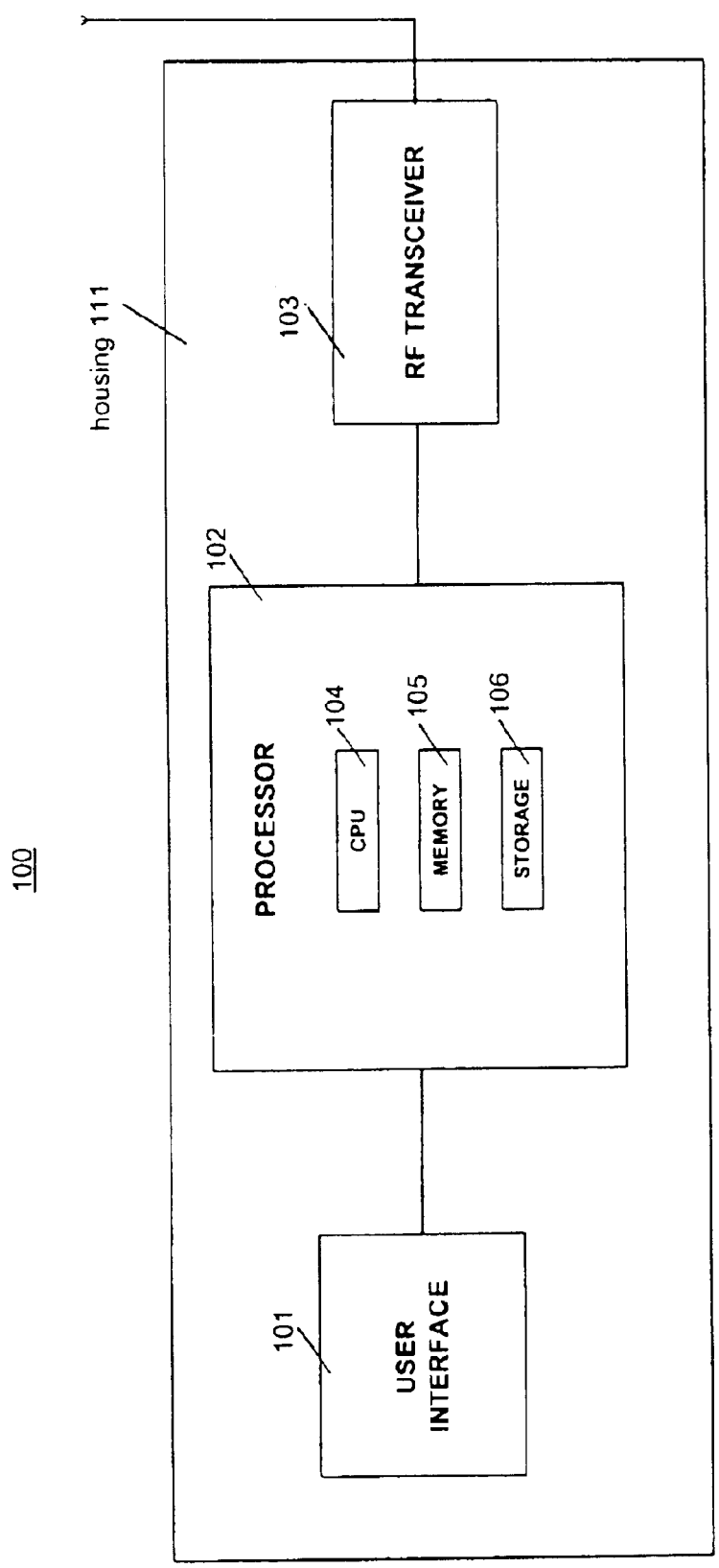
FIGS. 3A–3C are illustrative block diagrams of the base station according to FIG. 2 having an RF transceiver, processor, and user interface.

FIG. 3A is a functional block diagram illustrating some of the components of the base station 100 according to an exemplary embodiment. The base station 100 may be a mobile telephone, a PDA, handheld computer, laptop computer, desktop computer, a vending machine, cash register, or other equipment. The base station 100 is shown generally in FIGS. 3A–3C for simplicity. It should be understood that the exact structure of the base station 100 may differ from, or include additional elements than, that shown in FIGS. 3A–3C, depending on the nature of the base station 100.

As shown, base station 100 includes a user interface 101, a processor 102, an RF transceiver 103, a housing 111 for housing the components, and an antenna 112. Housing 111 may be used to house equipment that make up base station 100. Base station 100 and housing 111 may be sized and equipped to be readily transported and permit stand-alone operation. For example, housing 111 may be sized to be a handheld device, such as a PDA or mobile phone. Antenna 112 may be an omnidirectional antenna or a directional antenna. Antenna 112 may be contained within housing 111 or may protrude therefrom. The user operates the base station through the user interface 101. User interface 101 can include any number of input controls and output devices, such as a visual display, a keypad, pointer, a mouse, tracking ball, a four-button pad, speaker(s), a microphone, or any combination of the foregoing.

The processor 102 further includes a central processing unit (CPU) 102, memory 105, e.g., DRAM, and data storage medium 106. Processor 102 is coupled between the user interface 101 and the RF transceiver 103. Processor 102 receives phase and amplitude data (e.g., I and Q data, as will be used in the following examples) from the RF transceiver 103 and calculates distance, which can be displayed on the user interface or used to control a distance-based process. The processor also controls the transceiver 103 and receives control information from the user interface 101. The I/Q data from the RF transceiver 103 is typically stored in memory 105 for processing by CPU 104. Further, storage space 106 contains program instructions for the CPU as well as other static data such as the device ID information. In handheld devices, storage 106 is typically a non-volatile read only memory. In larger base station implementations, the storage space can be a hard disk drive. It is anticipated that the program instructions for the processor 102 can be embedded for storage, transport, or sale, in any suitable computer readable mediums, such as a floppy diskette, optical disk, a memory chip or a memory portion of a chip, or can be stored on a server and downloaded to the processor for use. The RF transceiver 103 is typically implemented as a combination of discrete components or a smaller number of integrated chipsets.

In addition to calculating the distance, for example, as described below, the processor 102 and the transceiver 103 may operate to communicate according to one or more communication protocols using the same or different frequencies than used for distance measurement. For example, if the base station 100 were a mobile telephone, the processor 102 and transceiver 103 may be used to handle mobile telephone communications. For example, the base station may transmit and receive communications signals with a cellular station, a satellite, or other network switching infrastructure. In addition, the processor 102 and transceiver 103 may be used to handle other communications protocol(s), such as Bluetooth, for example. The base station 100 may communicate directly with other wireless devices. In this regard, the base station 100 may use common equipment for distance measurement and for other communications. Alternatively, the RF transceiver 103 may be used solely for distance measurement.

Figure 3B:
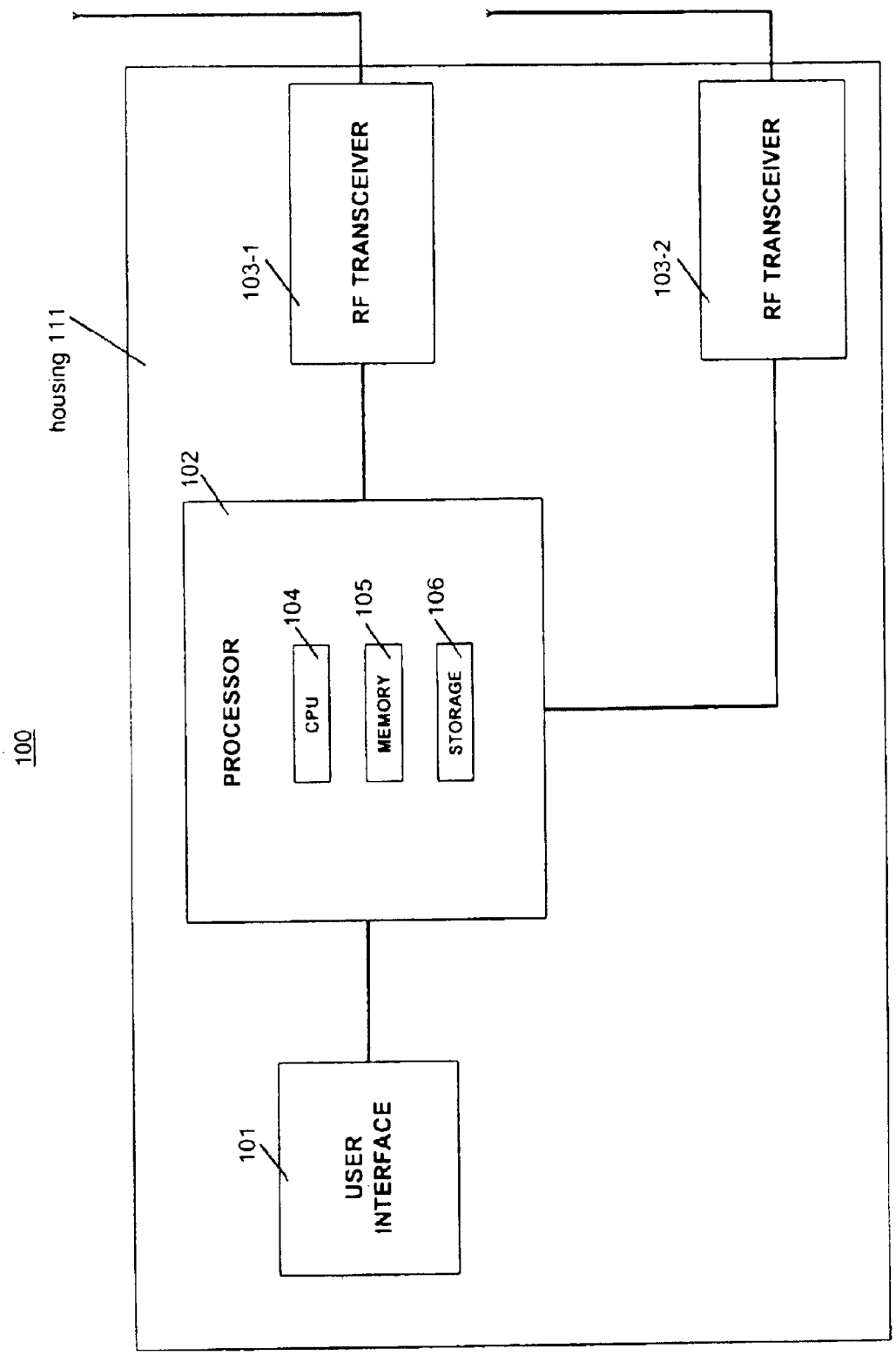

FIG. 3B illustrates a further exemplary embodiment of a base station 100. FIG. 3B is similar to FIG. 3A, but includes RF transceiver 103-1 and RF transceiver 103-2. In accordance with the embodiment of FIG. 3B, the RF transceiver 103-1 may be used for communications according to a first set of one or more communications protocols and RF transceiver 103-2 may be used for distance measurements and possibly communications according to a second set of one or more communications protocols. Processor 102 controls transceivers 103-1 and 103-2 and may process information received from either or both transceivers. In accordance with FIG. 3B, the base station 100 may be, for example, a mobile telephone. RF transceiver 103-1 may handle telephone communications and RF transceiver 103-2 may handle distance measurement RF transmissions and possibly other communications, such as Bluetooth communications.

Figure 3C:
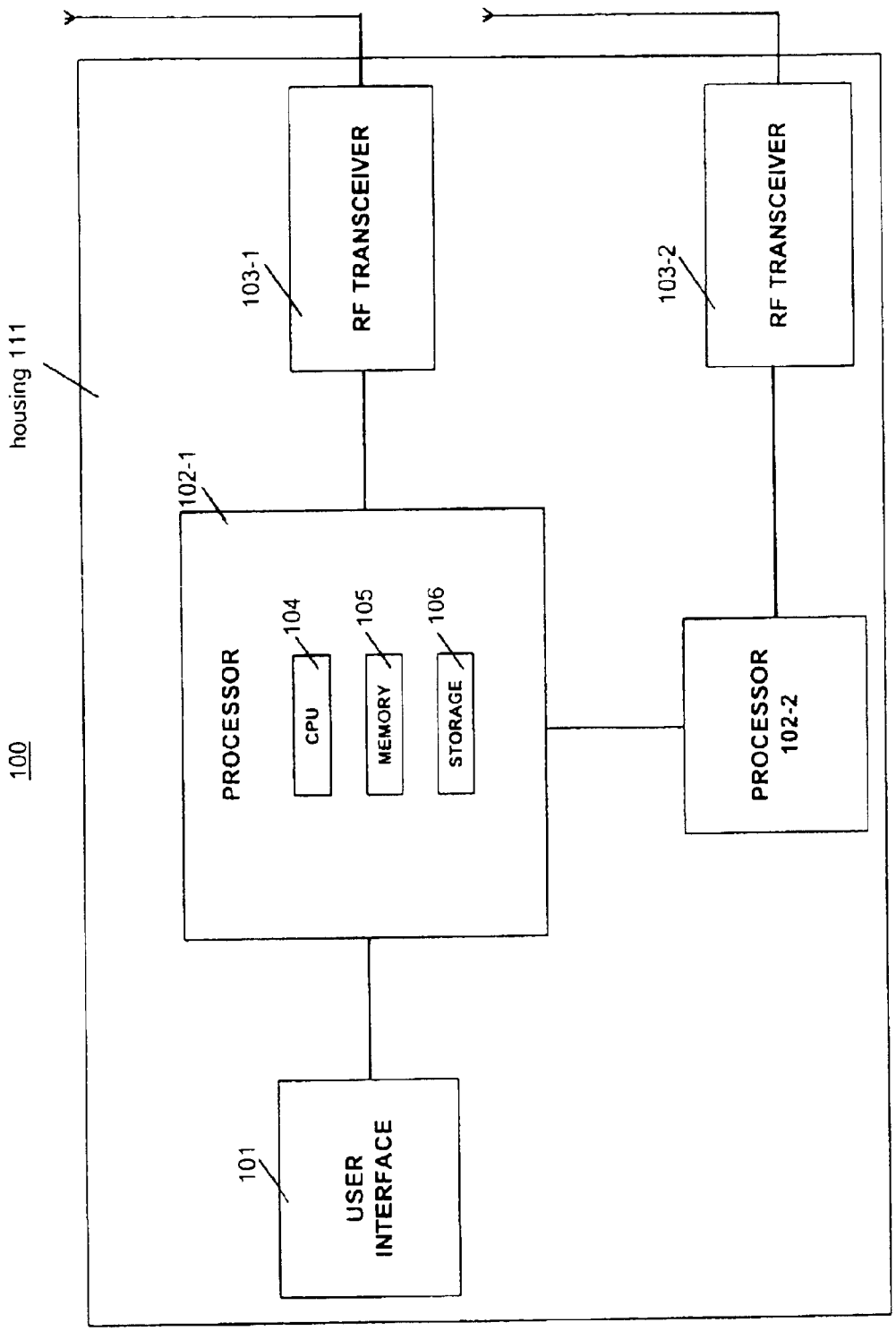

FIG. 3C illustrates a further exemplary embodiment of a base station 100. FIG. 3C is similar to FIG. 3A, but includes processors 102-1 and 102-2 and transceivers 103-1 and 103-2. In accordance with the embodiment of FIG. 3C, the processor 102-1 and RF transceiver 103-1 may be used for communications according to a first set of one or more communications protocols and processor 102-2 and RF transceiver 103-2 may be used for distance measurements and possibly communications according to a second set of one or more communications protocols. Processor 102-1 controls and may process data from transceiver 103-1 and processor 102-2. Processor 102-2 controls and processes information from RF transceiver 103-2. Processor 102-2 also communicates with processor 102-1. In accordance with FIG. 3C, the base station 100 may be, for example, a mobile telephone. RF transceiver 103-1 may handle telephone communications and RF transceiver 103-2 may handle distance measurement RF transmissions and other communications, such as Bluetooth communications. Processor 102-1 may be used to control mobile telephone communications and perform overall device control. Processor may be used for controlling distance measurement control, such as mathematical processing, and perform control operations for another communications protocol, e.g., Blueooth. The embodiments of FIGS. 3B and 3C are useful, for example, where the distance measurement functionality is added to an existing device design. In the embodiment of FIG. 3B, the processor 102 of the existing device may be loaded with software for performing distance measurement calculations. FIG. 3C provides an alternative where the processor 102-1 is not capable or would not be efficient for performing the distance measurement calculations.

Figure 4B:
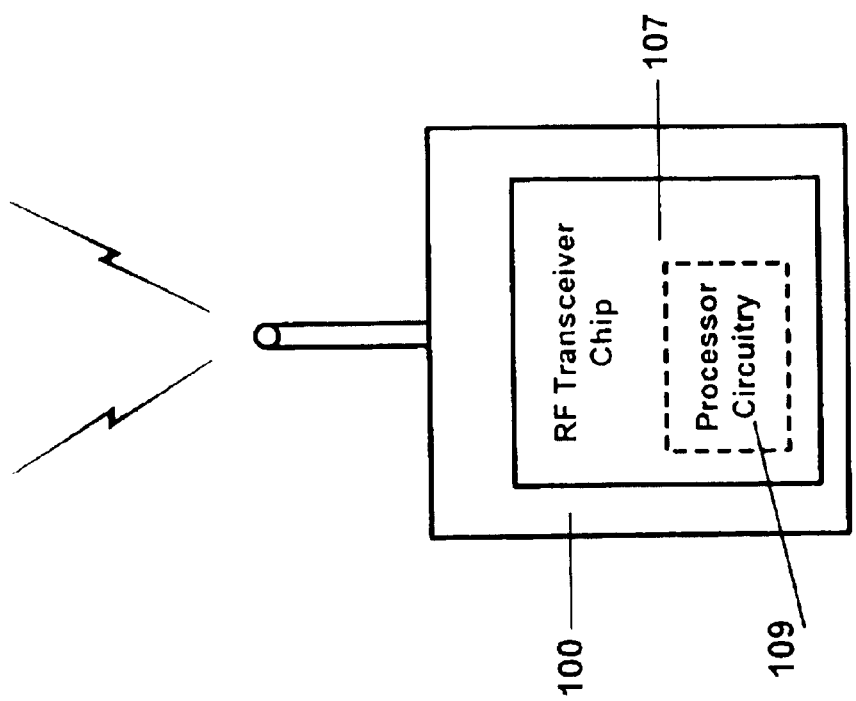
FIGS. 4A–4B are illustrative block diagrams of the base station according to FIG. 2.
Figure 4A:
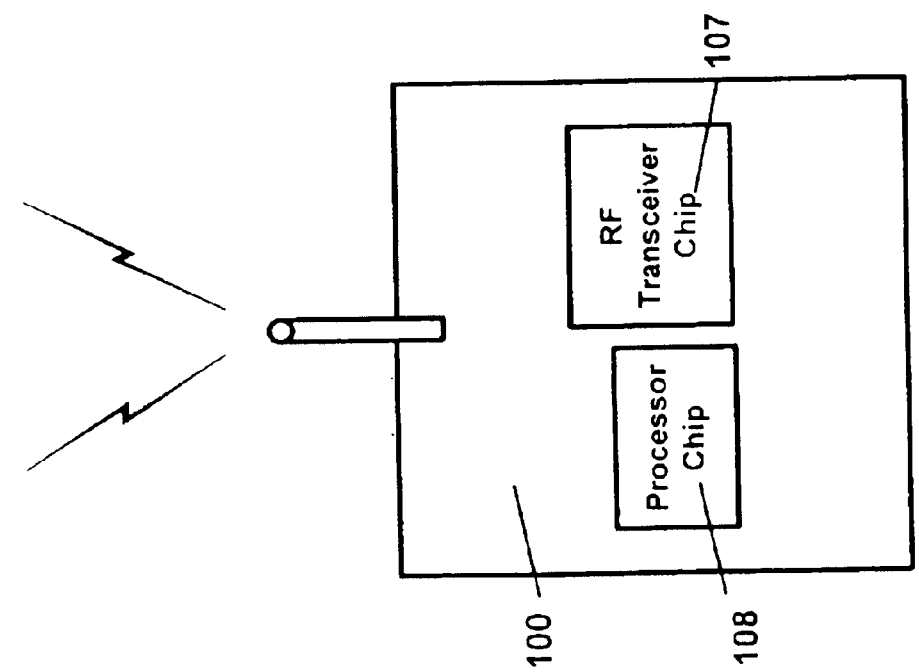

FIGS. 4A and 4B show two alternative implementations of the present invention in base station 100. As shown in FIG. 4A, the distance measurement functionality may be implemented as a separate processor chip 108 and used in conjunction with a RF transceiver chip 107. The processor chip 108 may be, for example, a general purpose microprocessor, a math processor, or an ASIC built using, for example, CMOS technology. The RF transceiver chip 107 may be, for example, a Bluetooth chip or other RF communications chip. The RF transceiver chip 107 may be built using bipolar technology or BiCMOS technology.

Alternatively, as shown in FIG. 4B, the RF transceiver chip 107 may include memory 109 and processor circuitry 110 for performing distance measurement calculations. The processor circuitry 110 may be general purpose processing circuitry or a specially-designed circuit for performing distance measurement calculations. Accordingly, the RF transceiver chip 107 may output a distance value directly. The RF transceiver chip 107 may be a Bluetooth chip. Other platforms will be known to those skilled in the art and are within the scope of the present invention.

Figure 5:
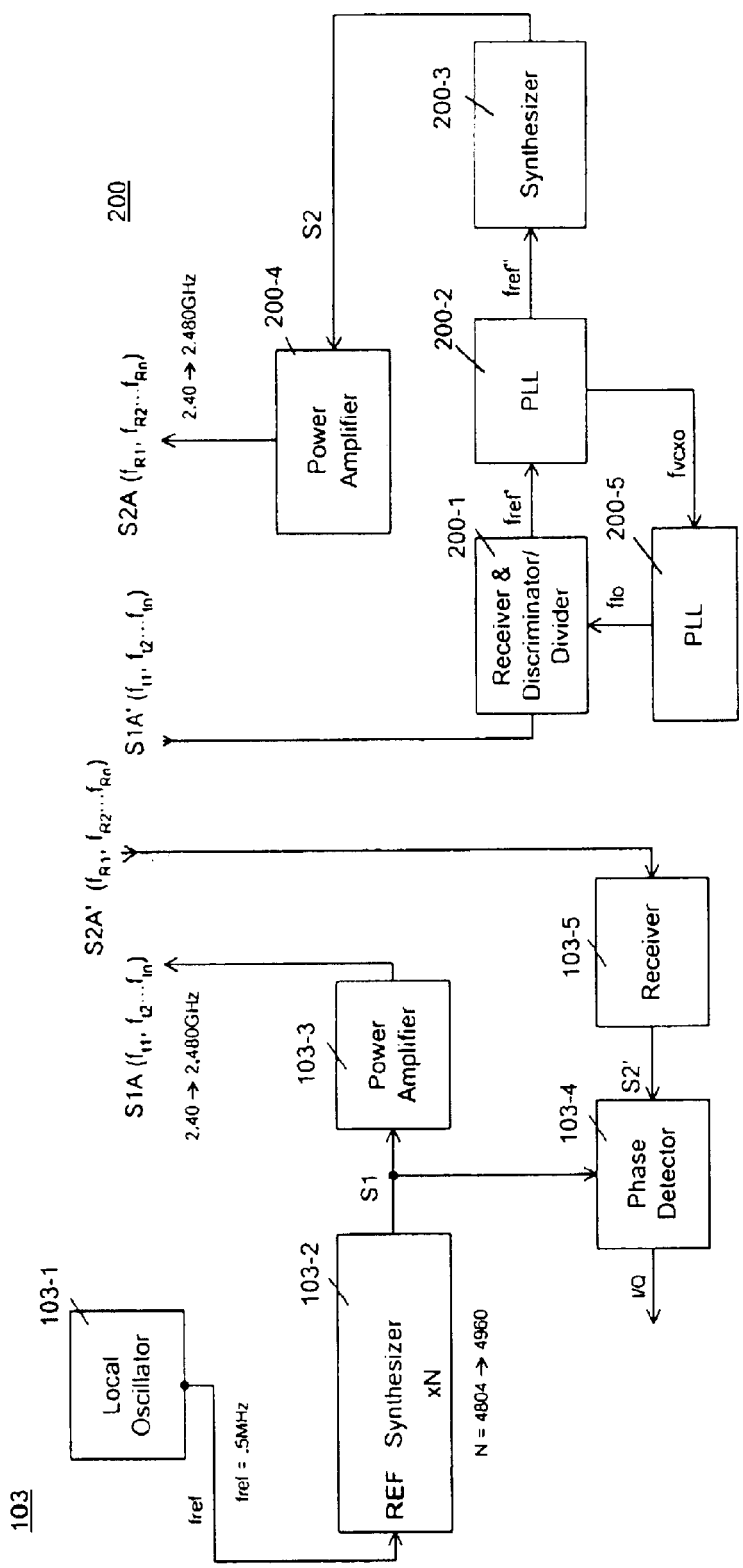
FIG. 5 is an illustrative functional block diagram of a base station and remote unit in accordance with an embodiment of the present invention.

FIG. 5 is a functional block diagram of an embodiment of the present invention. FIG. 5 illustrates circuitry that may be included in the base station transceiver 103 and the remote station 200. As shown, the base station transceiver 103 includes a local oscillator 103-1, synthesizer 103-2, power amplifier 103-3, phase detector 103-4, and receiver 103-5. Local oscillator 103-1 generates a system clock, or reference signal fref, which is coupled to the reference input of synthesizer 103-2. In this example, fref is set to 0.5 MHz. In other embodiments, synthesizer 103-2 can include a modulation input. A modulating signal, for example, a divided-down reference signal (fref/32), can be applied to the modulation input to modulate the output of synthesizer 103-2.

Synthesizer 103-2 generates a frequency hopping spread spectrum (FHSS) signal S1, which is comprised of a sequence of carriers at different frequencies. Each carrier is a multiple of the reference frequency fref. In this example, the multiplication factor N is used by synthesizer 103-2, and is a sequence of values between 4804 and 4960. Signal S1 is coupled to the input of power amplifier 103-3. Power amplifier 103-3 amplifies signal S1 and produces amplified FHSS signal S1A. Signal S1A is propagated over distance D to the remote unit 200. Further, power amplifier 103-3 can be controlled to turn ON and OFF, thereby enabling half-duplex operation.

Receiver 103-5 receives external FHSS signal S2A' (transmitted from remote station 200). Signal S2A' is comprised of a sequence of phase shifted carriers corresponding to the carriers of signal S1 generated by synthesizer 103-2. Further, the sequence of carriers of signal FHSS S2A' are equal in frequency to the sequence of carriers of signal S1 generated by the synthesizer 103-2. Signal S2' and S1 are coupled to the inputs of phase detector 103-4 for phase comparison. Phase detector 103-4 generates a sequence of DC I/Q outputs corresponding to the carriers of S2'.

Also shown in FIG. 5 is the remote station 200. Remote station 200 includes a receiver 200-1, phase locked loop (PLL) 200-2, synthesizer 200-3, power amplifier 200-4, and secondary PLL 200-5. The receiver 200-1 receives FHSS signal S1A' (comprised of a sequence of carriers having frequencies $f_{r1}$, $f_{r2}$, . . . $f_{rn}$) from the base station RF transceiver 103. Receiver 200-1 divides the received signal S1A by a factor R to generate reference signal fref'. For purposes of example, let R sequence through the range of integers 4804=>4960. Reference signal fref' is coupled to the input of PLL 200-2. PLL 200-2 uses fref as a synchronizing signal to lock reference signal fref". Reference signal fref" is coupled to the input of synthesizer 200-3.

Synthesizer 200-3 multiplies fref to generate FHSS signal S2, which is comprised of a sequence of frequencies $f_{r1}$, $f_{r2}$, . . . $f_{rn}$. FHSS signal S2 is coupled to the input of power amplifier 200-4, amplified, and transmitted to receiver 103-5 of base station transceiver 103. PLL 200-5 also generates a clock signal fvcxo, which is phase coherent with both fref and fref". Clock signal fvcxo is coupled to the input of secondary PLL 200-5. PLL 200-5 uses fvcxo as a synchronizing signal to generate a local oscillator signal flo coupled to receiver 200-1. Local oscillator signal flo is phase coherent with received signal S2A' and is used by the receiver to tune to signal S1A'.

Figure 6:
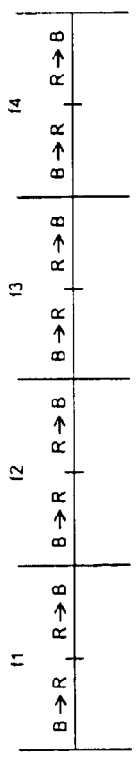
FIG. 6 is an exemplary timing diagram showing one possible timing sequence of the transmission between a base station and a remote station of FIG. 5.

The operation of this embodiment will be described with reference to FIGS. 5–6. As shown in FIG. 5, FHSS signal S1A is transmitted from base station transceiver 103 to remote unit 200. As shown in the timing diagram of FIG. 6, the S1A signal is comprised of a sequence of carriers f1, f2, f3 . . . fn. To implement a half-duplex system, where the return transmit carriers have the same frequency as the base station transmit carriers, transmit and receive operations must be time-multiplexed. In this example, the carrier of S1A having a frequency of f1 is transmitted by the base station to the remote station during a first time interval (B=>R). Subsequently, the same phase-shifter carrier is received by the base station during a second time interval (R=>B). Next, f2 is transmitted and received during alternating time intervals (B=>R) and (R=>B). In this way, the base station and remote station can utilize the same transmit band without interference.

The half-duplex transmission scheme described herein need not transmit carrier frequencies in incrementing order, and in practice, the sequential order of carrier frequency transmission may be quite random. In operation, it is only necessary that the base station and the remote station follow the same hopping sequence of carrier frequencies. Moreover, the half-duplex transmission embodiments described herein could be implemented using different frequencies for S1 and S2, or could be implemented using a single carrier signal for S1 and a FHSS signal for S2. Additionally, S1 could be modulated with a modulation signal and a phase-coherent reference signal could be recovered (through discrimination) by the remote station, from received signal S1A'. Many other transmission schemes are known and could take advantage of other variations of the half-duplex operation of this embodiment of the present invention.

As shown in FIG. 5, once the signal S1A' is received at the remote unit 200 by receiver 200-1, it is divided down to generate the reference signal $f_{ref}'$. In this example, the dividing factor R is selected from a sequence of integers ranging from 4804 to 4960. Each integer is selected according to the current transmit carrier frequency. PLL 200-2 generates a constant-running signal fref" using fref' as a synchronizing signal. After the transmission of signal S1A (fn) ceases, PLL 200-2 maintains the constant-running reference signal fref" with minimal frequency and phase drift.

Reference signal $f_{ref}'$ contains the phase information of the received signal S1A'. It can therefore be used to synchronize a VCXO within PLL 200-2. The VCXO within PLL 200-2 is used to generate signal $f_{ref}''$. Signal $f_{ref}''$ acts as a reference signal for synthesizer 200-3 to generate signal S2. Signal S2 includes a sequence of carriers having frequencies ($f_{r1}, f_{r2}, \ldots f_{rn}$). Each of the frequencies of S2 are phase coherent with reference signal fref' and fref". After transmission of a carrier from S1 by the base station transceiver 200 is complete, return signal S2 is amplified by power amplifier 200-1 to generate signal S2A and transmitted back to the base station transceiver 103.

At base station transceiver 103, FHSS signal S2A' is received and by receiver 103-5 and amplified to produce signal S2'. Signal S2' is phase compared with the S1 signal originally generated by synthesizer 103-2. The phase comparison may be performed by phase detector 103-4 thereby generating I/Q DC components, which are then stored in the memory of processor 102-2. One technique for performing phase comparison and for generating I/Q DC components can be implemented, for example, as suggested in related U.S. Application No. 09/759/601, and in related U.S. Application No. 09/759/601 both filed concurrently herewith and expressly incorporated by reference herein.

The I and Q components may be generated by mixing the received signal $\sin[2\pi f_r(t-2t)]$ with the locally generated signal $\sin[2\pi f_r\, t]$, where τ is the one-way time delay. Using the resulting I and Q components (stored in memory 105) to solve for τ yields:

$$Q/I = \tan[2\pi f_r * 2\tau]$$

$$\tau = \arctan(Q/I)/4\pi f_i$$

Figure 10:
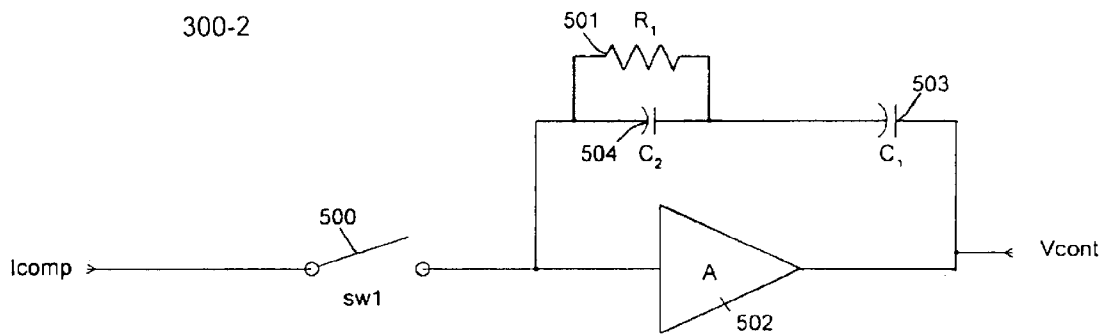
FIG. 10 is an illustrative functional block diagram of an integrator in accordance with the phase locked loop of FIG. 7.

Once an ambiguous value for τ(τ*) is determined, the phase shift $\Theta_1 := 2\pi f_1 \tau^*$ may be calculated. After the data (phase shift v. frequency) on the various frequencies is collected, a least mean square (LMS) error criteria is used to estimate the expected straight line curve. FIG. 10 illustrates one example of a plotting of the phase shift v. frequency data using τ:=130 ns and a starting frequency F:=76 MHz with increments of ΔF:=1 MHz such that $f_1 := F + \Delta F i$.

Figure 11:
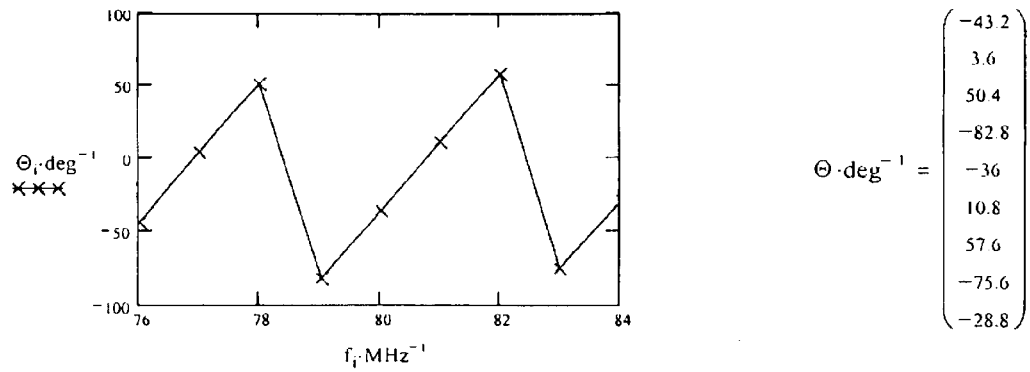
FIG. 11 is an exemplary chart showing one possible set of data obtained in accordance with the operation of the present invention.

As indicated in the graph of FIG. 11, a sawtooth curve results as the phase shift value "drops" to −π each time the phase shift cycles through π. To straighten out the angle v. frequency data, the following phase ambiguity algorithm is applied to a sequence of carriers having frequencies $f_{r1}, f_{r2}, \ldots f_{rn}$:

(1) φ(n):=0 if n=0; otherwise, (2) φ(n):=(Θn−Θn−1)+φ(n−1)+π if Θn−Θn−1<0

(3) φ(n):=(Θn−Θn−1)+φ(n−1) otherwise.

At step (1), the value of φ(n) is initialized to equal 0 for the first carrier frequency $f_{r0}$ thereby establishing a baseline for calculating the next plotted phase value.

At step (2), the algorithm checks for the negative slope (Θn−Θn−1<0) which would occur as the estimate drops to −π; as the phase difference cycles through +π. When the negative slope is detected, the algorithm adds the relative phase offset (Θn−Θn−1) of the points to the previous data point (φ(n−1))+π, and substitutes the resulting value for the zero estimate.

At step (3), if the algorithm determines that the slope is not negative, the algorithm adds the relative phase offset (Θn−Θn−1) of the points to the previous data point (φ(n−1)) and substitutes the resulting value for the zero estimate.

Figure 12:
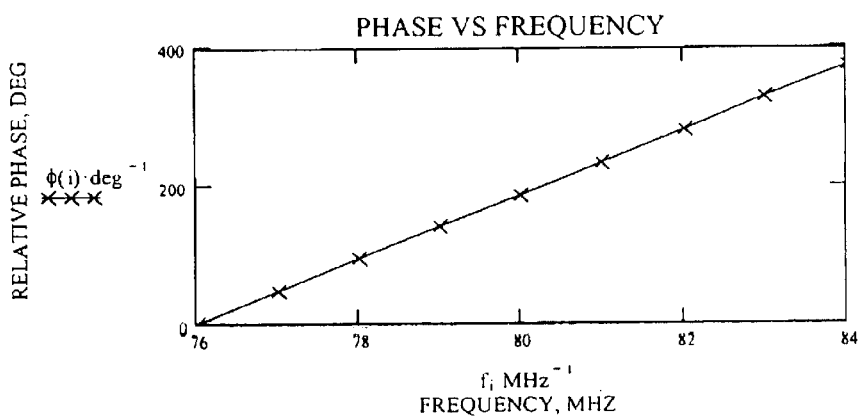
FIG. 12 is an exemplary chart of the data of FIG. 11 modified in accordance with a phase ambiguity algorithm of the present invention.

The modified data is then plotted using the parameters of a line $$\Phi_1 := \phi(i);\ m := \text{slope}(f,\Phi);\ b := \text{intercept}(f,\Phi);\ y(i) := m f_1 + b$$

to provide the phase v. frequency line shown in FIG. 12. The distance D in meters is determined from the slope (m) of the phase v. frequency line which is proportional to the delay T, i.e. T=m/2;. In the example of FIG. 11, D:=cT, where c:=3×10$^8$ m/s and T:=m/2π. Consequently, for the line illustrated in FIG. 12, T=130 ns resulting in a distance D=39m. Subsequently, the calculated distance data can be used to implement any number of distance-based processes as described above.

As previously described, accurate phase lock by the remote station is a factor in performing accurate distance measurement using the above-described method. First, in order to minimize the continuous drift, reference clock $f_{ref}''$ may be generated from a voltage controlled crystal oscillator (VCXO) rather than an internal VCO. Since the VCXO is a crystal oscillator, its total frequency span is narrow and hence the expected frequency drift is minimal. Moreover, other clock generators that are relatively insensitive to Δvin may be used to generate reference clock $f_{ref}''$. In other words, a similar change in input control voltage will cause less drift in the frequency of a VCXO than that of a VCO. Accordingly, a VCXO maintains frequency and phase stability longer than a VCO, although at the expense of frequency span.

Another area of concern is the elimination of frequency slip when the loop switch is opened. A double-ended charge pump maybe used so that the control switch is moved away from the output drivers. Specifically, the received reference signal is gated ON and OFF by means of a logic gate, which drives the double-ended charge pump.

Figure 7:
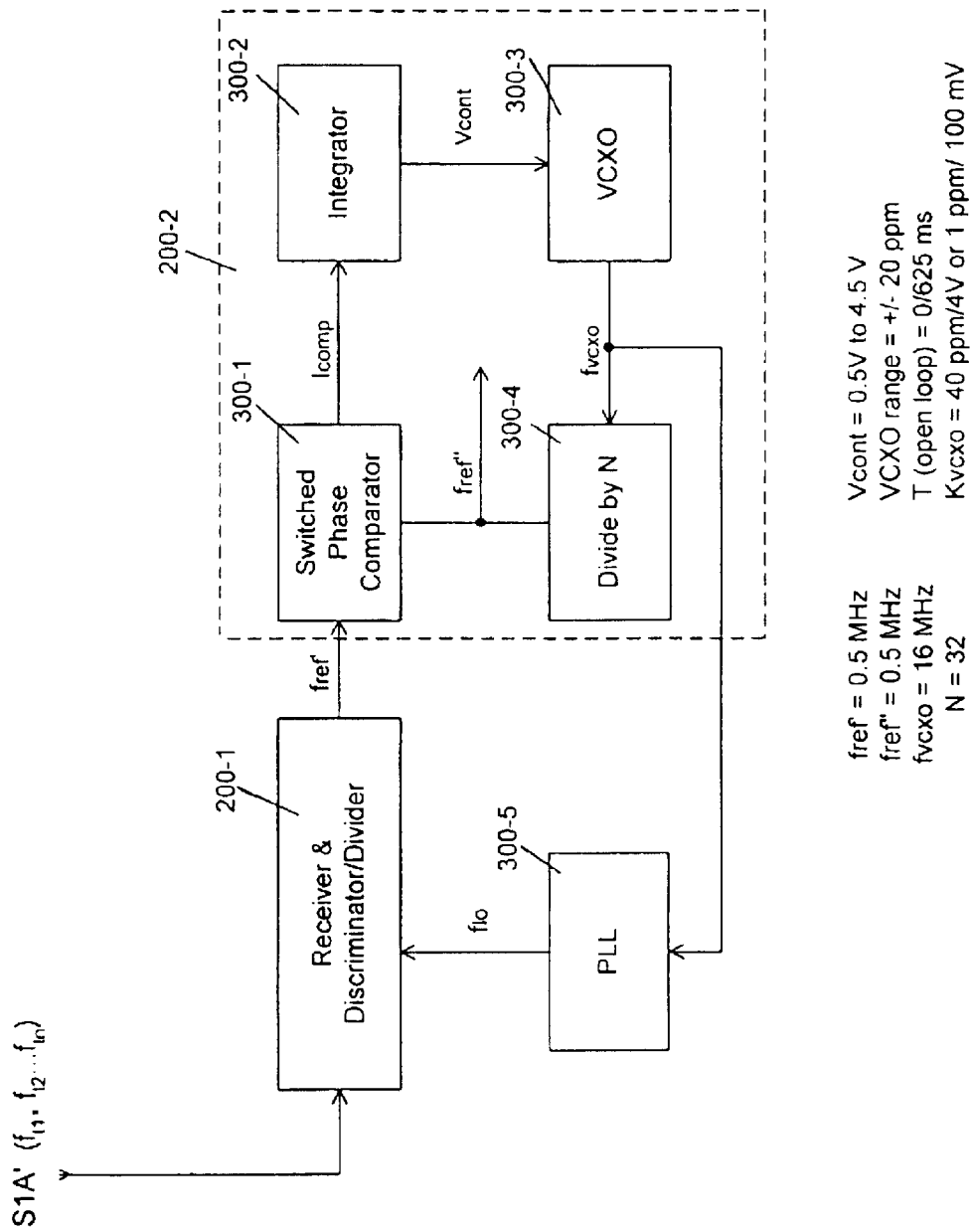
FIG. 7 is an illustrative functional block diagram of a phase locked loop in accordance with the remote station of FIG. 5.

FIG. 7 is an illustrative functional block diagram of PLL 200-2 of the remote station 200. PLL 200-2 includes a switched phase comparator 300-1, integrator 300-2, voltage controlled crystal oscillator (VCXO) 300-3, and divide by N circuit 300-4. Switched phase comparator 300-1 receives as an input fref' from the output of receiver & discriminator/divider 200-1. Switched phase comparator 300-1 also receives as an input a constant-running phase-locked reference signal fref" and generates an output current signal Icomp. Current signal Icomp is coupled to the input of integrator 300-2 to generate voltage control signal Vcont.

Signal Vcont is coupled to the input of VCXO 300-3 and acts as a control voltage for VCXO 300-3. VCXO 300-3, in response to the input control voltage Vcont, generates system clock signal fvcxo. Clock signal fvcxo is coupled to the input of Divide by N circuit 300-4 to generate feedback reference signal fref". As described above, fref" is used as a constant running reference input to switched phase comparator 300-1.

For purposes of example, the following parameters are use with respect to the present embodiment:

fref'=0.5 MHz fref"=0.5 MHz

Vcont=0.5V to 4.5 V fvcxo=16 MHz +/−20 ppm

N−32

Figure 8:
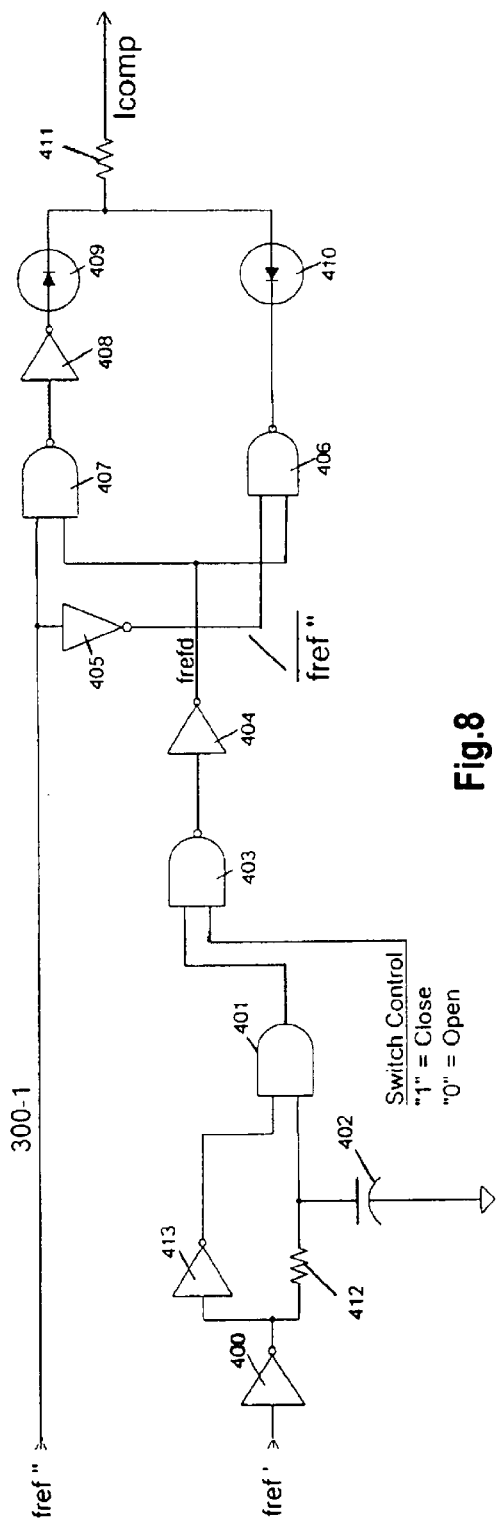
FIG. 8 is an illustrative functional block diagram of a switched phase comparator in accordance with the phase locked loop of FIG. 7.

FIG. 8 is an illustrative functional block diagram of switched phase comparator 300-1. Switched phase comparator 300-1 includes inverter 400, AND gate 401, capacitor 402, resistor 412, NAND gate 403, inverters 404-405, NAND gates 406-407, inverter 408, diodes 409-410, resistor 411, and inverter 413. As shown, inverter 400 receives input signal fref' from the receiver 103. The output of inverter 400 is coupled to the input of inverter 413. The output of inverter 413 is coupled to one input of AND gate 401. As shown, the output of inverter 400 is also coupled to a lowpass RC filter, having as components capacitor 402 and resistor 412. The output of the RC filter is coupled to the other input of AND gate 401.

The output of AND gate 401 is coupled to one input of NAND gate 403. The other input of NAND gate 403 is coupled to a logic switching signal. The output of NAND gate 403 is coupled to the input of inverter 404. The output of inverter 404 is coupled to one input of each of NAND gates 406 and 407. Input signal fref" is coupled to the other input of NAND gate 407, and the inverted phase signal fref" is applied to the other input of NAND gate 406 via inverter 405. The output of NAND gate 407 is coupled to the input of inverter 408. The output of inverter 408 is coupled to the cathode of diode 409 while the output of NAND gate 406 is coupled to the anode of diode 410. The cathode of diode 410 and the anode of diode 409 are both coupled to one node of resistor 411. The other node of resistor 411 outputs signal Icomp.

FIG. 10 is an illustrative functional block diagram of an integrator in accordance with the phase locked loop of FIG. 7. As shown, active integrator 300-2 includes a virtual switch (SW) 500, resistor (R1) 501, amplifier (A) 502, capacitor (C2) 504, and capacitor (C1) 503. For purpose of example, let C1=10 nF. As shown, virtual switch 500 switchably couples input current signal Icomp to the input of amplifier 502 and to one node of RC circuit R1/C2. The output of amplifier 502 is coupled to one node of capacitor C1 (503) and is output as control signal Vcont. Further, the other node of capacitor C1 (503) is coupled to the other node of RC circuit R1/C2.

As stated before, the VCXO has and output frequency of 16 MHz, an input voltage range of Vcont=0.5 V to 4.5 V, and a frequency deviation of +/−20 ppm. Assuming a linear behavior of the VCXO, it can be shown that the frequency/voltage constant Kvcxo=40 ppm/4V or 1 ppm/100 mV. Further, for purposes of example, let the open loop time Topen=0.625 ms If 0.01 ppm frequency drift is allowed for the open period (0.625 ms), the system can tolerate a 1 mV drop on the control voltage Vcont. The drop in the Vcont during the open period depends on the value of C1 (503), Topen, the total leakage DC current through the switch 500, the amplifier 502, and C1 (503) (Itotal), in the following way:

DeltaVcont=Itotal*Topen/C1, or: Itotal=Delta Vcont/Topen

Assuming Itotal is constant and inserting the above values for this case yields: Itotal=16 nA, which is an achievable value for this design. Accordingly, for this example, components should be selected so that the Itotal is less than 16 nA.

The operation of the PLL 200-2 will be describe with reference to FIG. 7. PLL 200-2 operates in closed-loop fashion at the time when S1A' is being received from the base station 100. During this time, the switched phase comparator 300-1 compares the constant running reference signal fref" to the received reference signal fref'. The average current output Icomp is proportional to the difference in phase between these two input signals. For example, if fref" begins to lead fref', Icomp decreases. Conversely, if fref" begins to lag fref', Icont increases. Integrator 300-2 integrates, or averages, the current values of Icomp and outputs the integrated value as Vcont. In this manner, momentary fluctuations in phase (and thus Icomp) are not reflected in the control voltage Vcont. This integration adds to the stability of the loop. Control voltage Vcont controls the phase and frequency of VCXO 300-3 within a narrow range of frequencies. System clock signal fvcxo is divided by a constant N to generate fref", which is fed back into the switched phase comparator 300-1, thereby completing the loop.

PLL 200-2 operates in open-loop fashion at the time when S1A is no longer being received. At that time, the switched phase comparator 300-1 is controlled to turn OFF. More specifically, in the OFF state, the reference signal fref' is no longer being phase compared to reference signal fref". As a result, Icomp ceases to flow in either direction. Ideally, under such conditions, integrator 300-2 should maintain its output control voltage Vcont at its current value indefinitely. However, some leakage always occurs within the integrator and Vcont will tend to slowly decrease at a given rate. As long as the change in Vcont remains small, the output from VCXO 300-3 will remain relatively constant in phase and frequency. Consequently, fref" will remain relatively constant in phase and frequency during open loop operation. Accordingly, the phase information from the previously received signal S2A' will be preserved in constant running reference signal fref". Reference signal fref" can thereafter be used by synthesizer 200-3 to generate a return signal S1A that is phase coherent with previously received base station signal S2A'. In this manner, the base station and remote station remain phased locked in half-duplex mode.

Figure 9:
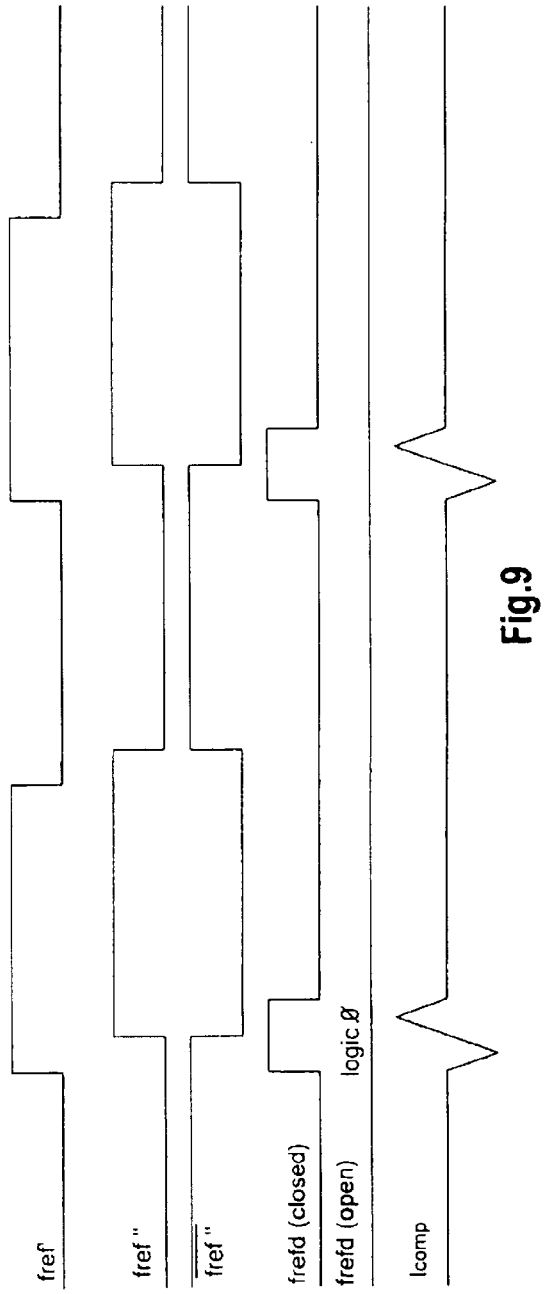
FIG. 9 is an exemplary timing diagram showing operation of the switched phase comparator in FIG. 8.

The operation of the switched phase comparator 300-1 shown in FIG. 8 will be described in more detail with reference to the timing diagram of FIG. 9. In closed loop operation, both input signals fref' and fref" are received by the switched comparator 300-1. As shown, these two signals are closely locked in phase and frequency, albeit there may be some constant phase offset. Reference signal fref' is first inverted by inverter 400 and then re-inverted by inverter 413. The inverted signal from the output of inverter 413 is coupled to one input of AND 401. The inverted signal fref is also coupled to a low pass RC circuit which includes resistor 411 and capacitor 402, effectively operating as a delay circuit. The output of the low pass RC circuit is coupled to the other input of AND 401. Because one path of the inverted fref signal is delayed with respect to the other path of the inverted fref" signal, AND 401 generates a momentary pulse each time there occurs a transition of fref from low-to-high. In the closed loop operation (Switch Control=1), the pulse is reflected at the one of the inputs of each of NAND gates 406 and 407 as signal frefd (fref delayed).

As shown, the other inputs of NAND gates 407 and 406 receive at their inputs fref" and the inverse of fref", respectively. At the times when fref" is high and the pulse signal frefd is high, the output of NAND gate 407 is asserted low, thereby forward biasing diode 409. At the times when the inverse of fref" is high and the pulse signal frefd is high, the output of NAND gate 406 is asserted low, thereby forward biasing diode 410. Consequently, as long as the signal fref" transitions at the center of pulse signal frefd (generated by fref'), equal and opposite amounts of current Icomp are consecutively generated. However, if the reference signal fref" begins to drift with respect to fref', a larger amount of positive or negative current Icomp is generated, thereby causing the VCXO to speed up or slow down. As such, the constant running reference signal fref" is corrected and synchronized with fref'.

After the reference signal fref" is phase locked to fref', but before the reference signal fref' generated by the receiver 200-1 stops, PLL 200-2 is controlled to enter open loop operation. To enter this mode, the switch control signal is set to a logical 0, thereby preventing pulses (derived from fref') from passing through NAND gate 403. Consequently, signal frefd remains at logical 0, thereby preventing NAND gates 406 and 407 from forward biasing either of diodes 409 and 410. Thus, in open loop mode, Icomp is approximately zero. As such, the integrator 300-2 maintains a constant output voltage Vcont, which causes the VCXO output fvcxo to remain constant, even after the synchronizing input signal fref' ceases. As a result, fref" is similarly held at a constant frequency. Reference signal fref" is used by synthesizer 200-3 to generate S2 so as to remain phase locked with base station 100.

Figure 13:
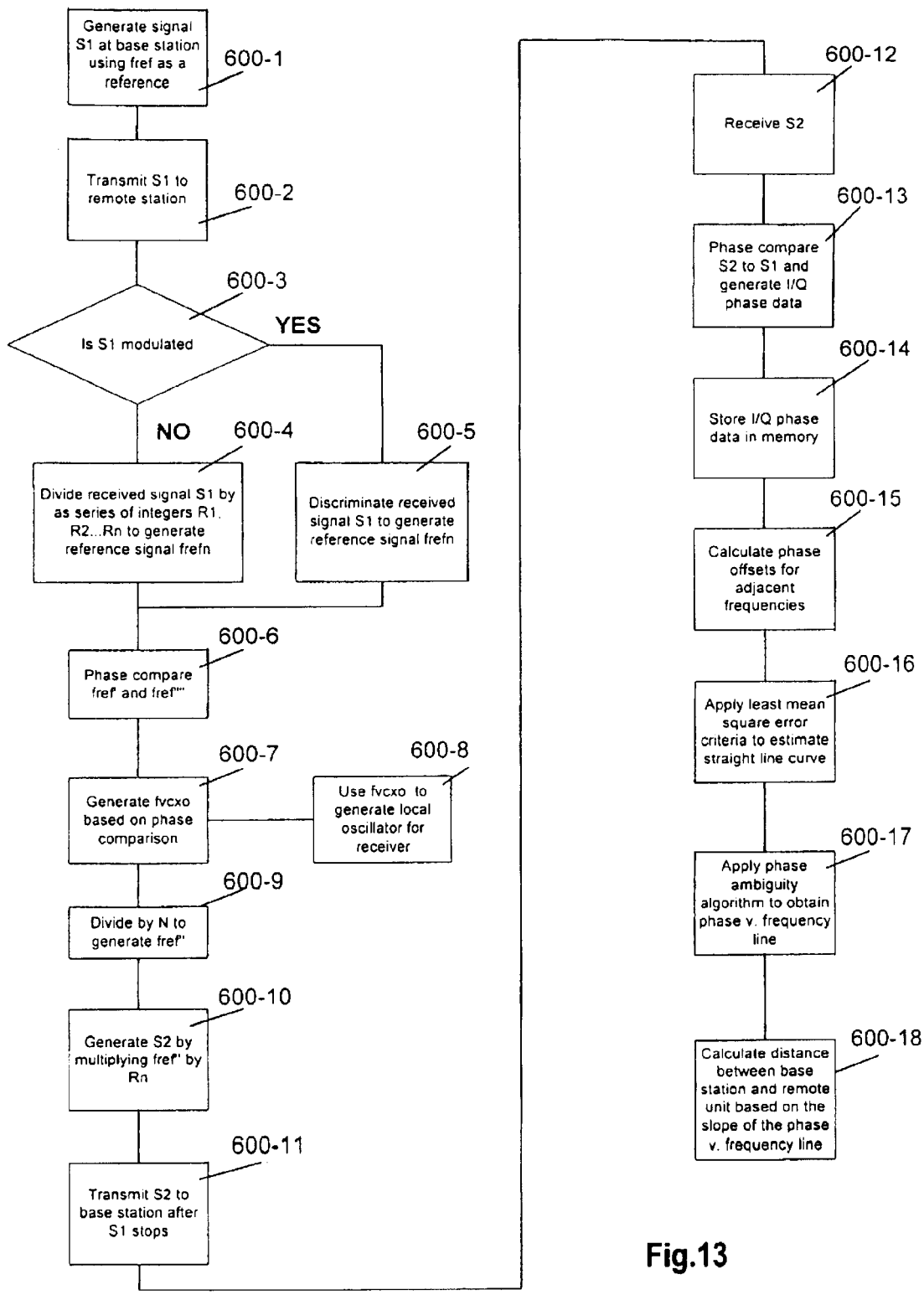
FIG. 13 is an illustrative flowchart of the steps for measuring the distance between two objects in accordance with an embodiment of the present invention.

There are many physical implementations capable of practicing the inventive methods described herein. For example, FIG. 13 illustrates the process steps used to perform distance measurement in accordance with an embodiment of the present invention. The steps could be applied to any number of system implementations. While steps 600-1 through 600-18 will produce the desired result, i.e. an accurate distance measurement between a base station and a remote station, the invention may be practiced without including each and every step shown.

Step 600-1 includes generating a first signal at a base station. The signal can be modulated or unmodulated by a modulating signal that is phase coherent with the first signal. At step 600-2, the first signal is transmitted to a remote station. At the remote station, at least two possibilities exist as shown by step 600-3. If the received signal is unmodulated, the receiver performs step 600-4. In step 600-4, the received signal is divided by a series of integers to generate a first reference signal which is phase coherent with the received signal. If the received signal is modulated, the receiver performs step 600-5. In step 600-5, the received signal is discriminated to generate a first reference signal which is coherent with the received signal. Therefore, regardless of whether the first signal is modulated or unmodulated, the result is to generate a first reference signal.

Step 600-6 includes comparing the first reference signal with a second constant-running reference signal. The result of the comparison is used, as shown in step 600-7, to control a VCXO. Step 600-8 includes using the output of the VCXO to generate a local oscillator for the receiver. In step 600-9, the output from the VCXO is divided by an integer N to produce the second constant-running reference signal. In step 600-10, the second constant-running reference signal is multiplied by a series of constants to product a second FHSS signal. In step 600-11, the second FHSS signal is transmitted to the base station and received at the base station at step 600-12. At step 600-13 the phase of the first and second FHSS signals are compared to generate I/Q phase data. Step 600-14 includes storing the I/Q data in memory and step 600-15 includes calculating phase offsets for adjacent frequencies. At step 600-16, a straight line curve is estimated, e.g., using a least mean square error criteria. Step 600-17 includes applying a phase ambiguity algorithm to obtain phase v. frequency line. The distance between the base station and the remote station is calculated based on the slope of the phase/frequency line at step 600-18.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A half-duplex wireless remote device for use in a distance measurement system, comprising:

a receiver for receiving a first radio frequency (RF) signal during a first time slot $A_n$ from a wireless communication device, the first RF signal including a sequence of carriers $f_n$, where n is a plurality of integers, wherein the sequence of carriers $f_n$ are phase coherent with a first reference signal generated at the wireless communication device, the receiver generating a second reference signal from the received first RF signal during the first time slot $A_n$, wherein the second reference signal is phase coherent with the received first RF signal;

a phase locked loop (PLL) for generating a third reference signal synchronized in frequency and phase with the second reference signal;

a synthesizer for generating a second RF signal, the second RF signal being phase coherent with the third reference signal and including a sequence of carriers corresponding to the carriers in of the first RF signal; and a transmitter for transmitting the second RF signal during a second time slot $B_n$, alternatingly repeat as n changes, and wherein said phase lock loop comprises a switched phase comparator for comparing the phase of the second and third reference signals and generating a phase output signal indicative of phase difference between the second and third RF signal, an integrator for filtering the phase output signal and generating a voltage signal, a voltage controlled oscillator (VCO) controlled by the voltage signal and generating a system clock, and a divider for dividing the frequency of the system clock by an integer N to generate the third reference signal, and wherein the third reference signal continues after the second reference signal is removed.

2. The wireless remote device according to claim 1, wherein the receiver divides the received first RF signal by a series of integers corresponding to the sequence of carriers $f_n$ of the first RF signal, thereby generating the second reference channel.

3. The wireless remote device according to claim 1, wherein the sequence of carriers $f_n$ of the first RF signal are modulated with a modulation signal, the phase of the modulation signal is coherent with each of the phases of the sequence of carriers $f_n$ of the first RF signal, and the receiver discriminates the received first RF signal, thereby recovering the second reference signal.

4. The wireless remote device according to claim 1, wherein the carriers $f_n$ of the first RF signal have the same frequencies as the corresponding carriers of the second RF signal.

5. The wireless remote device according to claim 1, wherein the carriers $f_n$ of the first RF signal have different frequencies than the corresponding carriers of the second RF signal.

6. The wireless remote device according to claim 1, wherein the VCO is a voltage controlled crystal oscillator (VCXO) having a narrow frequency span.

7. The wireless remote device according to claim 1, further comprising a secondary PLL for generating a local oscillator signal, wherein the system clock is used by the secondary PLL to synchronize the local oscillator signal, and wherein the receiver uses the local oscillator signal to tune to the carrier frequencies of the first RF signal.

8. The wireless remote device according to claim 1, wherein the switched phase comparator includes:

a pulse generator for generating a pulse signal corresponding to the second reference signal;

a logical gate having as an input the pulse and a digital control signal; wherein the gate passes the pulse signal when the digital control signal is in a first state indicative of closed loop operation and blocks the pulse signal when the logical control signal is in a second state indicative to open loop operation; and a digital comparator having as inputs the gated pulse signal and the third reference signal, wherein when the third reference signal leads the second reference signal, the comparator causes an output control signal to decrease in value and when the third reference signal lags the second reference signal, the comparator causes an output control signal signal to increase in value.

9. The wireless remote device according to claim 8, wherein the switched phase comparator further comprises:

a first gate having as inputs the third reference signal and the gated pulse signal, wherein when the gated pulse and the third reference signal are both asserted, the output of the first gate biases a first diode so that an output node; and a second gate having as inputs an inverse of the third reference signal and the gated pulse signal, wherein when the gated signal and the inverse of the third reference signal are both asserted, the output of the second gate biases a second diode so that current flows out of the output node, wherein the current at the output node is representative of the output control signal.

10. A system for determining distance using half-duplex communication, comprising:

a wireless communication device for transmitting a first radio frequency (RF) signal during a first time slot $A_n$ and receiving a second RF signal at a time slot $B_n$, the first RF signal including a sequence of carriers $f_n$, wherein n is a plurality of integers, wherein the sequence of carriers are phase coherent with a first reference signal; and a wireless remote device for receiving the first RF signal and transmitting the second RF signal, the wireless remote device comprising:

a receiver for receiving the first RF signal and generating a second reference signal synchronized in frequency and phase with the second reference signal synchronized in frequency and phase with the second reference signal;

a synthesizer for generating the second RF signal, the second RF signal being phase coherent with the third reference signal and including a sequence of carriers corresponding to the carriers $f_n$ of the first RF signals; and a transmitter for transmitting the second RF signal during a second time slot $B_n$, wherein the first time slot $A_n$ and the second time slot $B_n$ alternatingly repeat as n changes, wherein the wireless communication device compares the phase of the first and second RF signal to calculate distance between the wireless communication device and the wireless remote device, and wherein said phase lock loop comprises a switched phase comparator for comparing the phase of the second and third reference signals and generating a phase output signal indicative of phase difference between the second and third RF signal, an integrator for filtering the phase output signal and generating a voltage signal, a voltage controlled oscillator (VCO) controlled by the voltage signal and generating a system clock, and a divider for dividing the frequency of the system clock by an integer N to generate the third reference signal, and wherein the third reference signal continues after the second reference signal is removed.

11. The system according to claim 10, wherein the receiver divides the received first RF signal by a series of integers corresponding to the sequence of carriers $f_n$ of the first RF signal, thereby generating the second reference channel.

12. The system according to claim 10, wherein the wireless communication device modulates the sequence of carriers $f_n$ of the first RF signal are modulated with a modulation signal, wherein the phase of the modulation signal is coherent with each of the phases of the sequence of carriers $f_n$ of the first RF signal, and wherein the receiver discriminates the received first RF signal, thereby recovering the second reference signal.

13. The system according to according to claim 10, wherein the carriers $f_n$ of the first RF signal have the same frequencies as the corresponding carriers of the second RF signal.

14. The system according to claim 10, wherein the carriers $f_n$ of the first RF signal have different frequencies than the corresponding carriers of the second RF signal.

15. The system according to claim 10, wherein the VCO is a voltage controlled crystal oscillator (VCXO) having a narrow frequency span.

16. The system according to claim 10, wherein the receiver further comprises a secondary PLL for generating a local oscillator signal, wherein the receiver uses the local oscillator signal to tune to the carrier frequencies of the first RF signal.

17. The system according to claim 10, wherein the switched phase comparator includes:

a pulse generator for generating a pulse signal corresponding to the second reference signal;

a logical gate having as an input the pulse signal and a digital control signal, wherein the gate passes the pulse signal when the digital control signal is in a first state indicative of closed loop operation and blocks the pulse signal when the logical control signal is in a second state indicative of open loop operation; and a digital comparator having as inputs the gated pulse and the third reference signal, wherein when the third reference signal leads the second reference signal, the comparator causes an output control signal to decrease in value and when the third reference signal lags the second reference signal, the comparator causes the output control signal to increase in value.

18. The system according to claim 17, wherein the switching phase comparator further comprises:

a first gate having as inputs the third reference signal and the gated pulse signal, wherein when the gated pulse and the third reference signal are both asserted, the output of the first gate biases a first diode so that current flows into an output node; and a second gate having as inputs an inverse of the third reference signal and the gated pulse signal, wherein when the gated pulse signal and the inverse of the third reference signal are both asserted, the output of the second gate biases a second diode so that current flows out of the output node, wherein the current at the output node is representative of the valve of the output control signal.

19. A method of phase locking a wireless communication device and a wireless remote device, comprising the steps of:

receiving a first radio frequency (RF) signal during a first time slot an from the wireless communication device, the first RF signal including a sequence of carriers $f_n$, where n is a plurality of integers, wherein the sequence of carriers $f_n$ are phase coherent with a first reference signal generated at the wireless communication device;

generating a second reference signal during the time slot $A_n$ from the second reference signal, the second reference signal being phase coherent with the received first RF signal;

generating a third reference signal synchronized in frequency and phase with the second reference signal;

generating a second RF signal, the second RF signal being phase coherent with the third reference signal and including a sequence of carriers corresponding to the carriers $f_n$ of the first RF signal;

transmitting the second RF signal during a second time slot $B_n$, wherein the first time slot $A_n$ and the second time slot $B_n$ alternatingly repeat as n changes;

comparing the phase of the second and third reference signals to generate a phase output signal indicative of phase difference between the second and third RF signal;

filtering the phase output signal to generate a voltage signal;

generating a system clock having a frequency proportional to the voltage signal; and dividing the frequency of the system clock by an integer N to generate the third reference signal, wherein the third reference signal continues after the second reference signal is removed.

20. The method according to claim 19, further comprising the step of dividing the receiver first RF signal by a series of integers corresponding to the sequence of carriers $f_n$ of the first RF signal, thereby generating the second RF signal.

21. The method according to claim 19, further comprising the steps of:

modulating the sequence of carriers $f_n$ of the first RF signal with a modulation signal, wherein the phase of the modulation signal is coherent with each of the phases of the sequence of carriers $f_n$ of the first RF signal; and discriminating the received first RF signal, thereby recovering the second reference signal.

22. The method according to claim 19, wherein the carriers $f_n$ of the first RF signal have the same frequencies as the corresponding carriers of the second RF signal.

23. The method according to claim 19, wherein the carriers $f_n$ of the first RF signal have different frequencies than the corresponding carriers of the second RF signal.

24. The method according to claim 19, wherein the system clock is generating by a voltage controlled crystal oscillator (VCXO) having a narrow frequency span.

25. The method according to claim 19, further comprising the steps of:

synchronizing a local oscillator signal with the system clock; and tuning to the carrier frequencies $f_n$ of the first RF signal by using the synchronized local oscillator signal.

* * * * *